(12) United States Patent
Lange

(10) Patent No.: US 9,388,861 B2
(45) Date of Patent: Jul. 12, 2016

(54) INCLINED YOKE UNIVERSAL JOINT

(71) Applicant: FORD GLOBAL TECHNOLOGIES, LLC, Dearborn, MI (US)

(72) Inventor: Olav Lange, Bottrop (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/166,331

(22) Filed: Jan. 28, 2014

(65) Prior Publication Data

US 2014/0213373 A1  Jul. 31, 2014

(30) Foreign Application Priority Data

Jan. 28, 2013 (DE) .......................... 10 2013 201 276

(51) Int. Cl.
*F16D 3/40* (2006.01)
*F16D 3/26* (2006.01)
*F16D 3/38* (2006.01)

(52) U.S. Cl.
CPC *F16D 3/26* (2013.01); *F16D 3/387* (2013.01); *F16D 3/40* (2013.01)

(58) Field of Classification Search
CPC .............. F16D 3/387; F16D 3/40; F16D 3/26
USPC ............. 464/110, 112, 119, 134–136; 74/492
See application file for complete search history.

(56) References Cited

U.S. PATENT DOCUMENTS 5,415,588 A * 5/1995 Wier ......................... F16D 3/32
8,747,236 B2 * 6/2014 Pattakos et al.

FOREIGN PATENT DOCUMENTS

| DE | 10012222 A1 | 10/2001 | |
|----|----|----|----|
| IT | 582068 * | 9/1958 | ..................... 464/134 |
| JP | H-07174158 A | 7/1995 | |

OTHER PUBLICATIONS

Germany Search Report for Application No. 10 2013 201 276.4, dated May 25, 2016.

* cited by examiner

*Primary Examiner* — Gregory Binda
(74) *Attorney, Agent, or Firm* — Jones Robb, PLLC; Raymond L. Coppiellie

(57) ABSTRACT

A universal joint of the present disclosure includes a first joint yoke and a second joint yoke. A first joint axis is formed at a first angle with respect to a longitudinal axis of a first shaft connected to the first joint yoke and a second joint axis is formed at a second angle with respect to a longitudinal axis of a second shaft connected to the second joint yoke. At least one of the first and second angles of the first and second joint yokes may be an obtuse angle or an acute angle. A connection element is configured to couple the first joint yoke to the second joint yoke via the first and second joint axes.

18 Claims, 9 Drawing Sheets

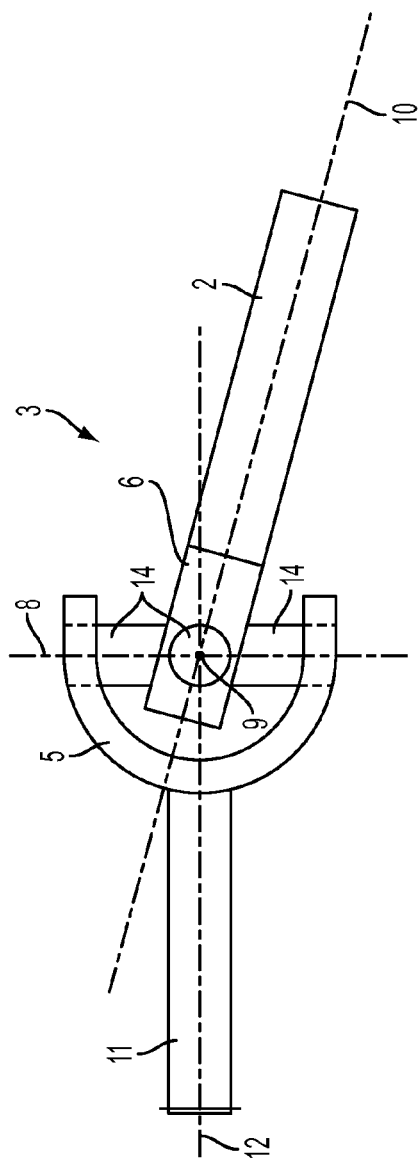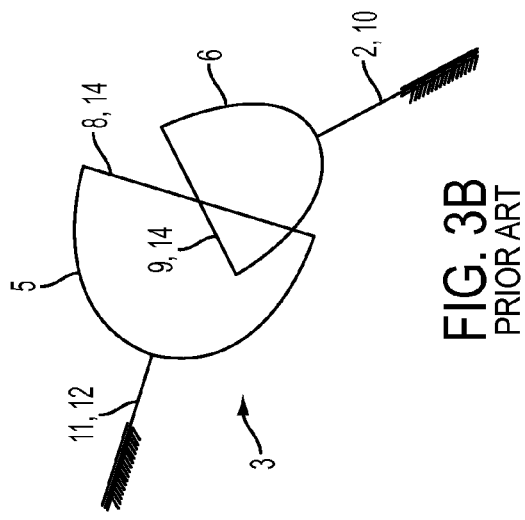
FIG. 3A PRIOR ART
FIG. 3B PRIOR ART

INCLINED YOKE UNIVERSAL JOINT

CROSS REFERENCE TO RELATED APPLICATIONS

This application claims priority to German Application No. 102013201276.4, filed on Jan. 28, 2013, the entire content of which is incorporated by reference herein.

TECHNICAL FIELD

The present disclosure relates generally to a universal joint for connecting torque transmitting shafts. In particular, the present disclosure relates to a universal joint for connecting torque transmitting shafts of steering columns of motor vehicles.

BACKGROUND

In motor vehicles, steering columns transform steering wheel rotation to steering rack translation and thence to the wheels of the vehicle. In particular, steering columns transmit a steering angle and steering torque from a steering wheel to a steering gear, e.g., to a rack and pinion steering gear, in a known manner. Steering columns that are commonly used today are generally bent, including multiple shafts connected to one another by universal joints to form the transmission path. The configuration of the steering column promotes safety and space conservation. The universal joints or Hooke's joints, allow even offset paths of the steering column connection. The rotation of the steering wheel and the steering wheel torque may be considered input into the system. A constant rotational velocity at the input shaft results in a variable output shaft velocity. The steering ratio of the steering column is generally a periodic function of the steering wheel angle (SWA), leading to a rotary motion which is transmitted non-uniformly by the steering column and which can be described by means of a transfer function. The function has a period of 180° SWA. This means the steering column transfer characteristic is exactly the same after half a rotation.

One known practice is to design the steering ratio either for a fast or a slow ratio in the central steering position or to select the steering ratio in such a way that the overall non-uniformity of the steering column is minimized.

In small passenger vehicles, a faster ratio in the central steering position can help to improve the feel of the steering, especially when traveling straight ahead. However, a slower steering ratio can improve the steering behavior of the vehicle when towing trailers, for example, especially in the case of small trucks.

In certain steering columns having conventional universal joints in the transmission path thereof, there are, however, certain limits to the adaptation of the transmission ratio since the transfer function of such steering columns has, as noted above, a period of 180° as a result of the universal joints used. For comfort, the non-uniformity of the rotary motion of the steering column should always be kept below a certain level so as to not obtain undesirable, perceptible torque fluctuations, e.g., when parking the vehicle. In some cases, adaptation of the non-uniformity of the transmission ratio of conventional steering columns can also lead to an undesirable high steering torque in the region of the respective steering lock.

It may be desirable, therefore, to provide a universal joint for connecting torque transmitting shafts, which significantly widens the scope for the design of the transmission of the rotary motion and to provide a steering column constructed with a universal joint of this kind.

SUMMARY

In accordance with various exemplary embodiments, the present disclosure provides a universal joint for connecting torque transmitting shafts. The universal joint has two joint yokes, each of which can be connected to one of the shafts. Each of the shafts has a longitudinal axis and a pair of bearing means. Each of the bearing means defines a joint axis. A joint part is arranged between the joint yokes, the joint part having two pairs of complementary bearing means. The two joint yokes are coupled to one another by the joint part in a pairwise interaction between the bearing means and the complementary bearing means. At least one joint axis forms an acute angle or an obtuse angle with the corresponding shaft longitudinal axis, wherein the acute angle or the obtuse angle deviates no more than about 10° from a right angle.

In accordance with another exemplary embodiment, a steering column for a motor vehicle is provided. The steering column comprises at least two torque transmitting shafts, and at least one universal joint connecting the at least two torque transmitting shafts. The at least one universal joint has two joint yokes, each of which can be connected to one of the shafts. Each of the shafts has a longitudinal axis and a pair of bearing means. Each of the bearing means defines a joint axis. A joint part is arranged between the joint yokes, the joint part having two pairs of complementary bearing means. The two joint yokes are coupled to one another by the joint part in a pairwise interaction between the bearing means and the complementary bearing means. At least one joint axis forms an acute angle or an obtuse angle with the corresponding shaft longitudinal axis, wherein the acute angle or the obtuse angle deviates no more than about 10° from a right angle.

In accordance with a further exemplary embodiment, a universal joint comprises a first joint yoke and a second joint yoke. A first joint axis is formed at a first angle with respect to a longitudinal axis of a first shaft connected to the first joint yoke and a second joint axis is formed at a second angle with respect to a longitudinal axis of a second shaft connected to the second joint yoke. A connection element is configured to couple the first joint yoke to the second joint yoke via the first and second joint axes, and at least one of the first and second angles is an obtuse angle or an acute angle.

In accordance with yet another exemplary embodiment a steering column for a motor vehicle comprises a first torque transmitting shaft having a first longitudinal axis and a first joint yoke and a second torque transmitting shaft having a second longitudinal axis and a second joint yoke. A first joint axis is defined by the first joint yoke and a second joint axis is defined by the second joint yoke. At least one of the first and second joint axes is formed at one of an acute angle and an obtuse angle relative to a respective longitudinal axis. The first and second joint yokes are coupled to one another by a connection element.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 3A shows a side view of the conventional universal joint shown in FIG. 2 in an assembled state;

FIG. 3B shows a schematic geometric view of the conventional universal joint shown in FIG. 3A in an assembled state;

Figure 1:
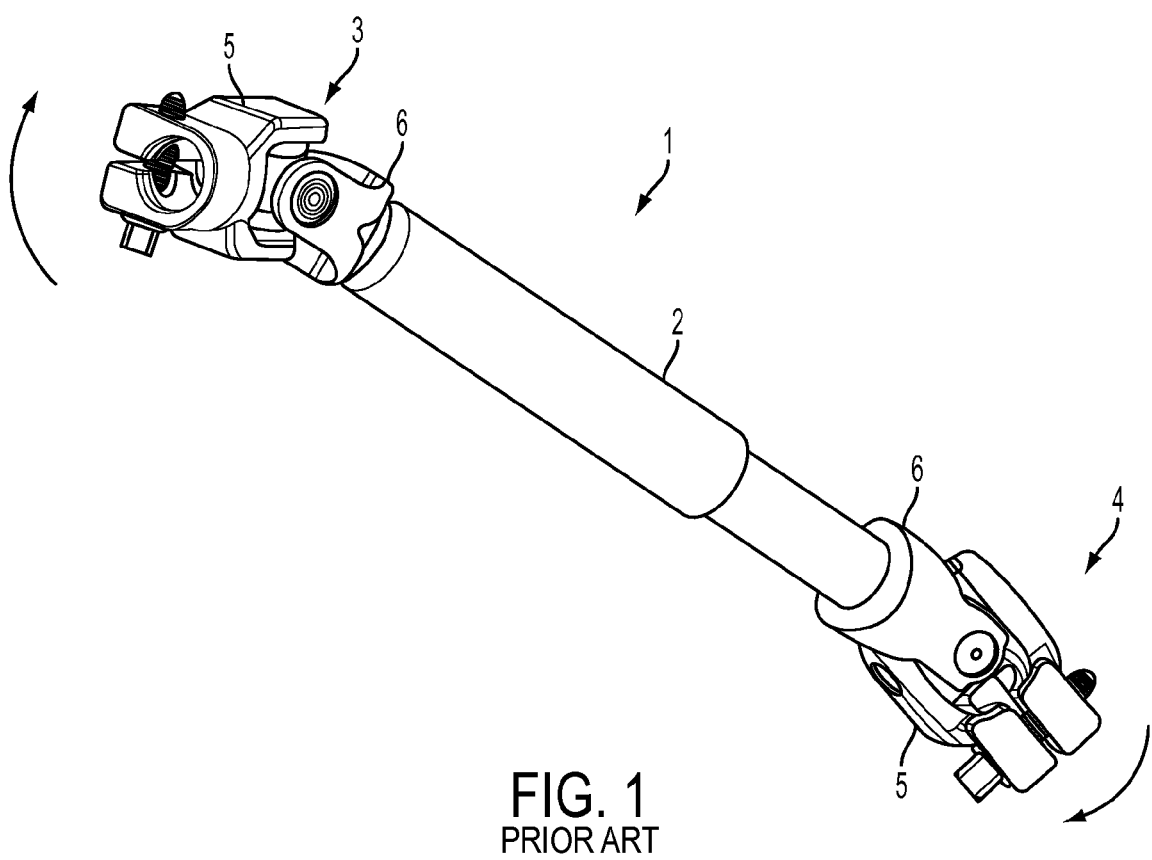
FIG. 1 shows a perspective side view of a section of a conventional steering column.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with various exemplary embodiments, the present disclosure provides a universal joint for connecting torque transmitting shafts. In particular, the universal joints in accordance with the present disclosure may be used to connect steering columns of motor vehicles. The steering columns may include two joint yokes, each of which can be connected to a torque transmitting shaft. Each of the torque transmitting shafts includes a longitudinal axis and a pair of bearing means, each of the bearing means defining a joint axis. The universal joint further includes a joint part which is arranged between the joint yokes and has two pairs of complementary bearing means, wherein the two joint yokes are coupled to one another by the joint part in a manner which involves pairwise interaction between the bearing means and the complementary bearing means.

In accordance with the present teachings, at least one joint axis of the universal joint defines an acute or obtuse angle with the corresponding shaft longitudinal axis, wherein the acute angle or the obtuse angle between the joint axis and the corresponding shaft longitudinal axis in each case deviates in terms of magnitude from a right angle (approximately 90°) by less than about 10°. In an alternative embodiment, the acute or obtuse angle between the joint axis and the corresponding shaft longitudinal axis deviates from a right angle by less than about 15°. An acute angle is one which is smaller than 90°, whereas an obtuse angle is one which is greater than 90°. Thus, in accordance with the present teachings, at least one joint axis of the universal joint does not form a right angle (90°) with the corresponding shaft longitudinal axis. The corresponding shaft longitudinal axis is the longitudinal axis of the shaft which can be connected to the joint yoke defining the joint axis. The result is a universal joint which has a transfer function with a period of 360°, as will be explained in greater detail below, thereby giving rise to completely new design possibilities for the universal joint without increasing the installation space taken up by the universal joint in comparison with a conventional universal joint.

Figure 8:
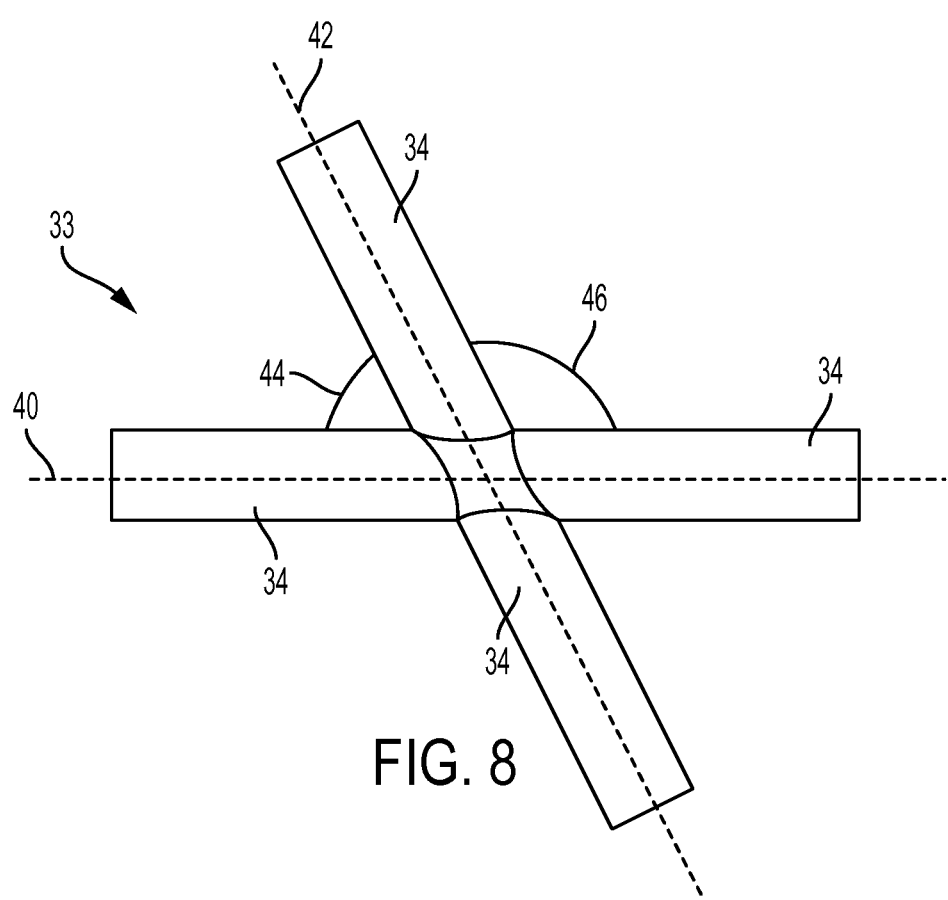
FIG. 8 shows a schematic perspective view of a joint part having bearing axes that intersect at an acute angle or obtuse angle.
Figure 7D:
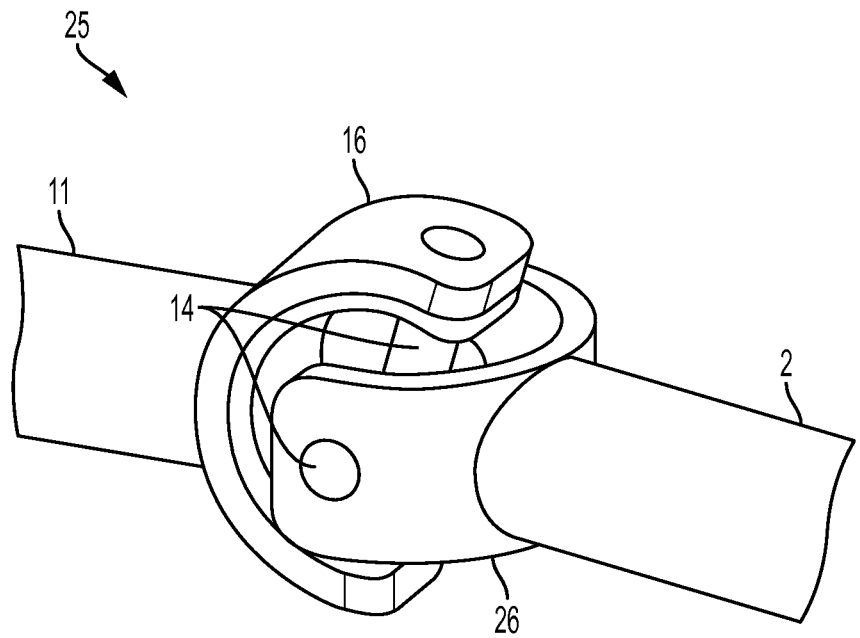
FIG. 7D shows a perspective view of the universal joint of FIG. 7A, including joint axes that form acute or obtuse angles with respect to longitudinal axes of the shafts, in accordance with the present teachings.
Figure 9:
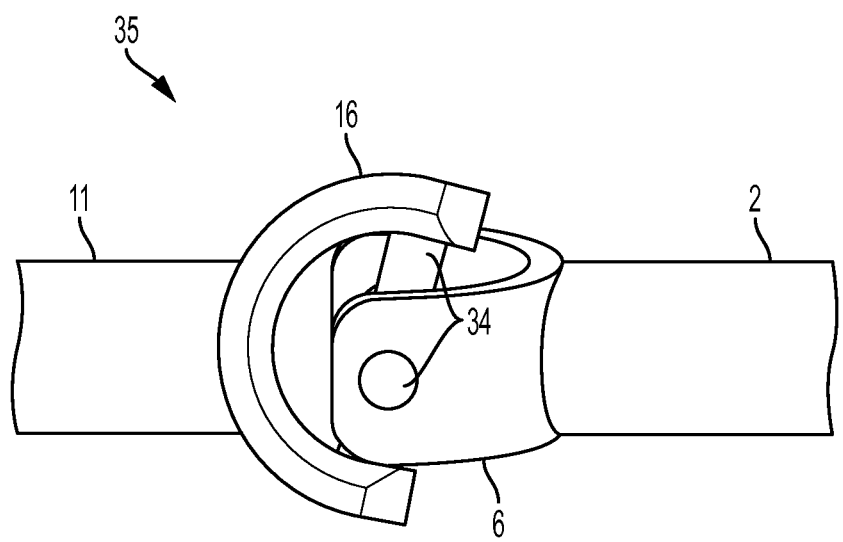
FIG. 9 shows a side view of a third embodiment of a universal joint including a joint part having bearing axes that intersect at an acute angle or obtuse angle.

According to an advantageous exemplary embodiment of the present disclosure, each pair of the complementary bearing means defines a bearing axis, and the bearing axes intersect at a right angle, i.e., at approximately 90°. An alternative exemplary embodiment of the invention (e.g., universal joint 35), as depicted in the exemplary embodiment of FIG. 9, envisages that each pair of the complementary bearing means (e.g., bearing journals 34 of joint part 33 (see FIG. 8)) defines a bearing axis (e.g., axes 40, 42 (see FIG. 8)), and that the bearing axes intersect at an acute (e.g., angle 44 (see FIG. 8)) or obtuse angle (e.g., angle 46 (see FIG. 8)).

Another advantageous exemplary embodiment of the present disclosure envisages that each of the complementary bearing means includes a bearing journal and each of the bearing means comprises a bearing opening which receives one of the bearing journals in each case.

In accordance with another exemplary embodiment of the present teachings, a steering column for a motor vehicle in accordance with the present teachings includes at least two torque transmitting shafts connected to one another by a universal joint as described in one or more of the exemplary embodiments above.

FIG. 1 shows a perspective side view of a section of a conventional steering column 1. The steering column section shown comprises a torque transmitting shaft 2, the axial ends of which are connected to respective conventional universal joints 3 and 4. The steering column section illustrated in FIG.

1 is used in a generally known manner to transmit the steering movements made via a steering wheel (not shown in FIG. 1) to a steering gear (not shown), e.g., to a rack and pinion steering gear. For this purpose, the steering wheel is connected to the joint yoke 5 of the upper universal joint 3 shown in FIG. 1, e.g., via a further shaft (not shown in FIG. 1), and the input side of the steering gear is connected to the joint yoke 5 of the lower universal joint 4 shown in FIG. 1. The output side of the steering gear is connected in a known manner, e.g., via a steering linkage, to the pivotal wheels of a vehicle, ensuring that the steering inputs made by a driver of the vehicle are transmitted by the steering wheel, via the steering column and the steering gear, to the wheels. Depending on requirements, the steering column 1 can comprise one or more of the steering column sections shown in FIG. 1.

The universal joints 3 and 4 make an offset path of the steering column connection, thereby making it possible, for example, to achieve steering column sections which are shorter and therefore advantageous in terms of positioning, in particular as it relates to safety issues (e.g., accidents) and space considerations. However, the transfer function of the rotary motion of a conventional universal joint which connects two shafts to one another is highly dependent on the deflection angle of the universal joint. In general, the non-uniformity of transmission of the rotary motion by the universal joint from one shaft to the other increases with a larger deflection angle.

Figure 2:
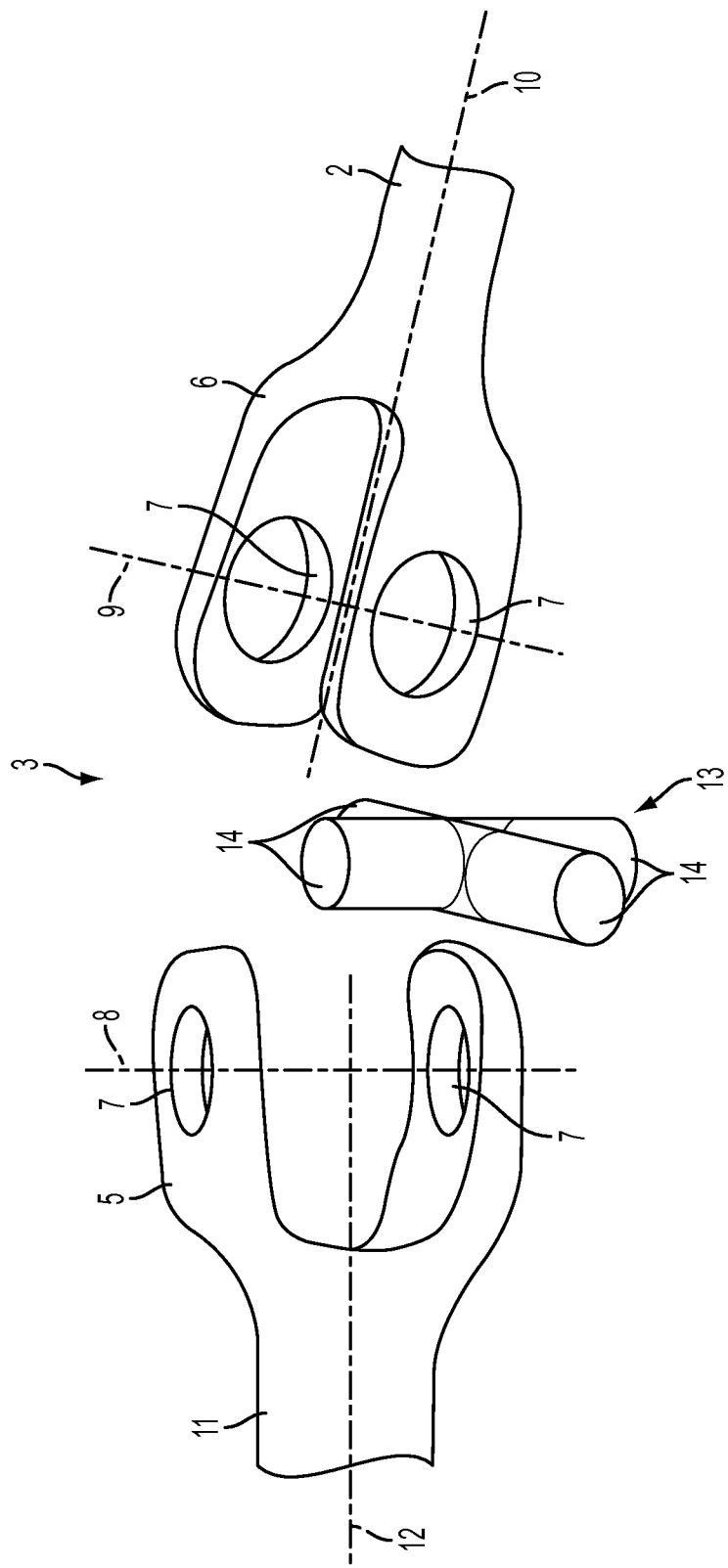
FIG. 2 shows a perspective side view of a disassembled conventional universal joint.

As illustrated in FIG. 1, the universal joints 3 and 4 each have two joint yokes 5 and 6. Each of the joint yokes 5, 6 has a pair of bearing means 7 in the form of bearing openings, and each pair of bearing means 7 or bearing openings defines a joint axis 8, 9 in a respective joint yoke, as can be seen in FIG. 2. FIG. 2 further illustrates that shaft 2 defines a shaft longitudinal axis 10, and a shaft 11 connected to joint yoke 5 in FIG. 2 defines a corresponding shaft longitudinal axis 12.

In the disassembled state of universal joint 3 which is shown in FIG. 2, a connector element such as a joint part 13 is arranged between the joint yokes 5 and 6, each joint yoke having two pairs of complementary bearing means in the form of bearing journals 14. In the assembled state of universal joint 3, the bearing means or bearing openings 7 of the joint yokes 5 and 6 interact pairwise with the complementary bearing means, or bearing journals 14, with the result that the joint yokes 5 and 6 are coupled to one another by the joint part 13. As also shown in FIG. 2, the joint axes 8 and 9 in the conventional universal joint 3 each form a right angle with the corresponding shaft longitudinal axes 12 and 10, respectively. Moreover, the joint axes 8 and 9 and the shaft longitudinal axes 10 and 12 all intersect at a single point in the assembled state of universal joint 3.

Each pair of complementary bearing means or bearing journals 14 defines a bearing axis (not shown specifically in FIG. 2). The bearing axes correspond to the respective longitudinal axes of the bearing journals 14.

FIG. 3A shows a side view of the conventional universal joint 3 of FIG. 2 in an assembled state. FIG. 3B shows a schematic geometric view of the conventional universal joint 3 of FIG. 3A in the assembled state. As is evident, the bearing axes of the joint part 13, which are defined by the bearing journals 14, coincide in the assembled state of universal joint 3 with the joint axes 8 and 9 defined by the joint yokes 5 and 6. Moreover, the bearing axes of the joint part 13 intersect at a right angle, i.e., at approximately 90°, in the conventional universal joint 3. Hence, the joint axes 8 and 9 of the conventional universal joint 3 shown in FIGS. 3A and 3B also intersect at a right angle. As already mentioned, the shaft longitudinal axes 10 and 12 in the universal joint 3 also form a right angle with the corresponding joint axes 9 and 8, respectively.

A constant speed of rotation, present at shaft 11 for example, is transmitted non-uniformly to shaft 2 by universal joint 3 in accordance with the deflection angle defined by the shaft longitudinal axes 12 and 10 relative to one another. The transfer function of the speed of rotation is a nonlinear function which depends substantially on the angle of rotation of shaft 11 and the deflection angle between shafts 11 and 2. In the case of the conventional universal joint 3 illustrated in FIGS. 2, 3A, and 3B, the transfer function has a period of 180° of the angle of rotation. This means that the characteristics of the transfer function after half a rotation of shaft 11 (180°) are precisely the same and are repeated after every 180° of rotation.

Since, as illustrated in FIG. 1, a steering column generally has two or more universal joints and, therefore, several torque transmitting shafts, the angular orientation of the individual steering column sections can be used to influence the overall transfer function of the steering column. For example, one aim may be to minimize the non-uniformity of the overall transfer function of the steering column or to configure the steering with a fast or slow ratio in a central position of the steering, i.e., when the vehicle is traveling straight ahead. However, there are limits to such adaptations owing to the 180° period of the transfer function of conventional universal joints.

Figure 4A:
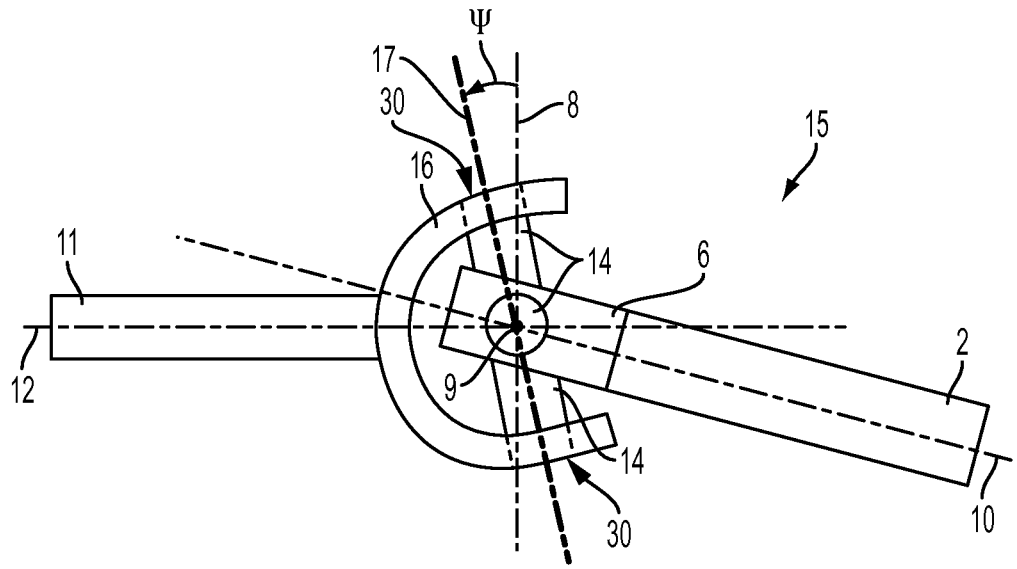
FIG. 4A shows a side view of a universal joint in accordance with the present teachings.
Figure 4B:
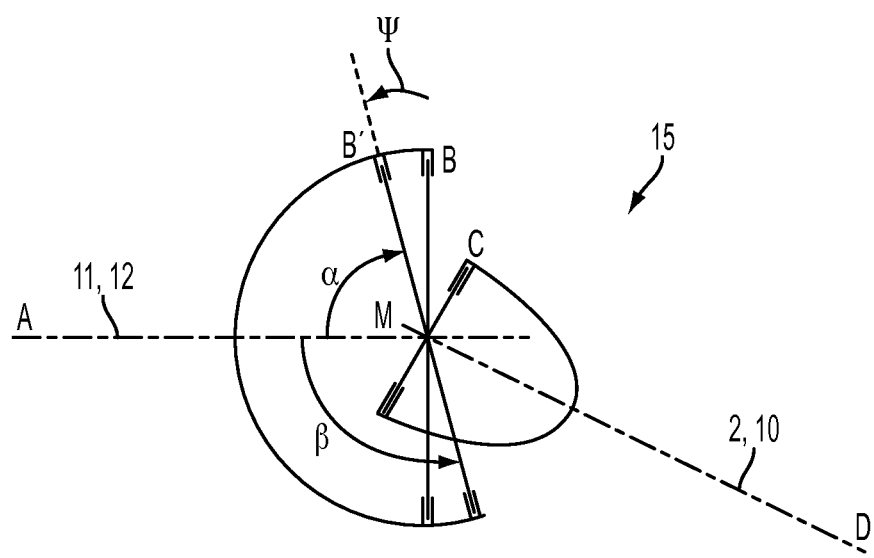
FIG. 4B shows a schematic geometric view of the universal joint of FIG. 4A in accordance with the present teachings.

FIG. 4A shows a side view of an exemplary universal joint in accordance with the present teachings and FIG. 4B shows a schematic geometric view of the exemplary universal joint of FIG. 4A. As provided herein, universal joint 15 differs from the conventional universal joint 3 illustrated in FIGS. 3A and 3B essentially by having a joint yoke 16 of a different kind (i.e., an inclined joint yoke). Like the joint yoke 5 of universal joint 3, inclined joint yoke 16 has a pair of bearing means in the form of bearing openings 30. The bearing openings 30 define a joint axis 17 which is inclined by the angle ip relative to the joint axis 8 of joint yoke 5 in the plane of the drawing. On the other hand, joint axis 9 in the illustrative embodiment of the universal joint 15 shown in FIG. 4A is unchanged relative to the conventional universal joint 3 illustrated in FIGS. 3A and 3B. In the universal joint 15, two pairs of complementary bearing means in the form of bearing journals 14 form a joint part 13 as shown in FIG. 2, by means of coupling joint yokes 16 and 6 one another in an articulated manner.

In accordance with the present teachings and owing to the inclination of joint axis 17, the joint axis 17 of the universal joint 15 forms an acute angle $\alpha$ or an obtuse angle $\beta$ (depending on the direction of view of the joint) with the shaft longitudinal axis 12. FIGS. 7A, 7B, 7C, and 7D depict an embodiment in which joint axis 32 of the universal joint 25 having inclined joint yokes 16 and 26 forms an acute angle $\alpha_2$ or an obtuse angle $\beta_2$ (depending on the direction of view of the joint) with the shaft longitudinal axis 10, in addition to joint axis 17 forming an acute angle $\alpha_1$ or an obtuse angle $\beta_1$ with shaft longitudinal axis 12.

Owing to the inclination of joint axis 17 by the angle $\phi$ relative to the joint axis 8 of the conventional universal joint 3, the transfer function of the universal joint 15 has a period of 360°, which is superposed on the 180° period of the conventional universal joint. Thus, in accordance with the present teachings, the properties of the transfer function of the universal joint 15 are repeated only after a complete revolution of 360°.

In FIG. 4B, the line segment M-C is perpendicular to the plane formed by A, M and B, the plane also referred to as plane A-M-B. B' lies in the plane A-M-B. Line segment M-C is therefore perpendicular to line segment M-B and perpendicular to line segment M-B'. Point B' is obtained by rotating point B by the angle φ about line segment M-C. In the above description, the plane A-M-B lies in the plane of the drawing of FIG. 4B. Line segment M-B indicates the direction of the joint axis 8 of the conventional universal joint 3 illustrated in FIG. 3, whereas line segment M-B' indicates the direction of the joint axis 17 of the universal joint 15 according to the invention illustrated in FIG. 4A.

Figure 5:
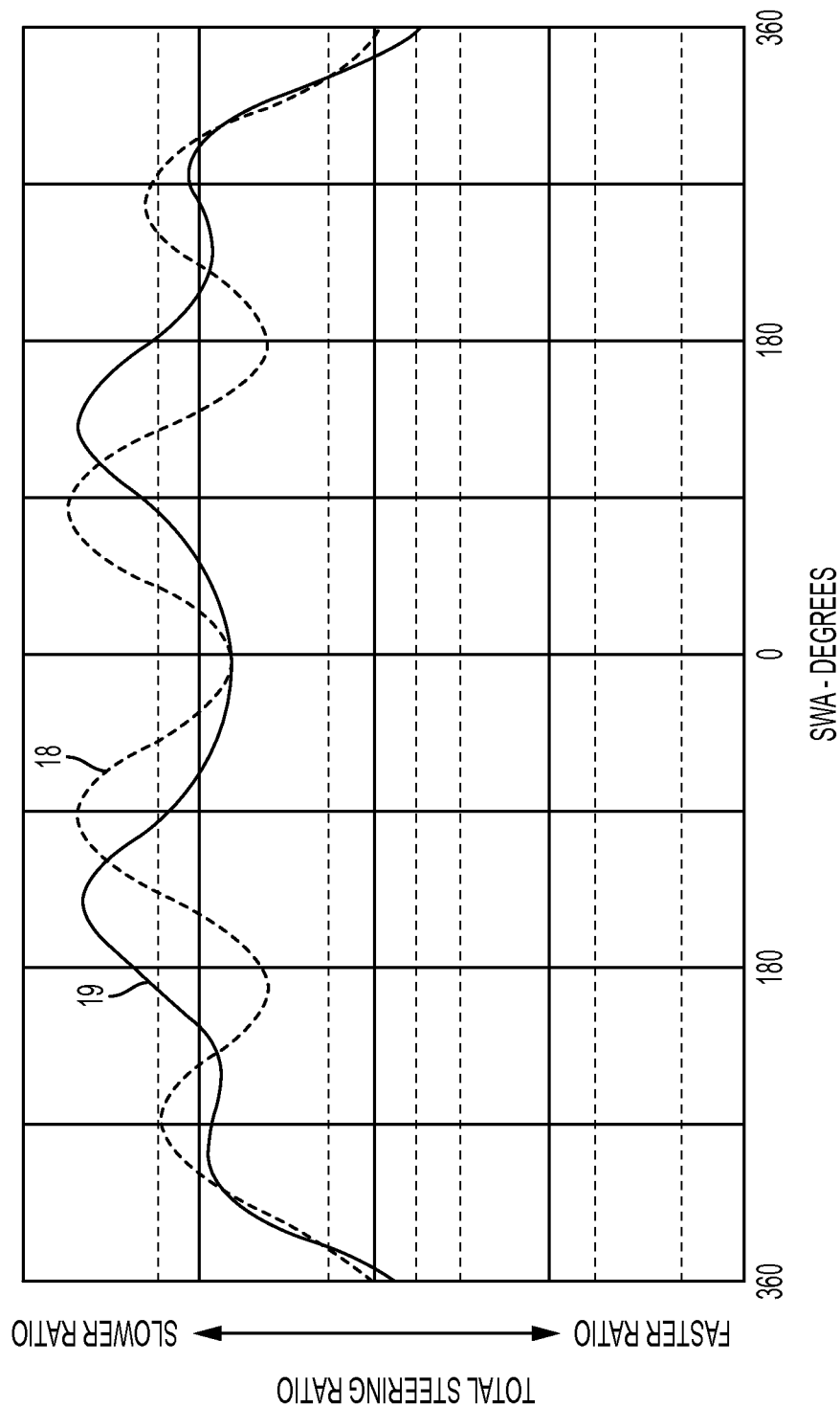
FIG. 5 shows a first diagram intended to illustrate the action of a steering column fitted with a universal joint in accordance with the present teachings.

FIG. 5 illustrates the action of a steering column fitted with at least one universal joint in accordance with the present teachings. The angle of rotation of −360° to 360° is plotted on the abscissa. The overall transmission (steering) ratio of the steering column (i.e., the total steering ratio, which is defined as the quotient of the angular velocity of the steering wheel and the average angular velocity of the left and right wheels around their respective central vertical axes, or, stated differently, as the quotient rotational velocity at the steering wheel and the average rotational velocity of the left and right wheels about the wheels' respective central vertical axes) is plotted on the ordinate including the overlaid ratio from the suspension system. Graph 18 shows a state of the art curve for a standard (conventional) universal joint configuration in the steering column with a fast steering ratio in the straightahead position or central position (approximately 0°) of the steering column. The column ratio has a period of 180° over the range of ±360°. A second configuration of the steering column having an inclined yoke universal joint with a 360° non-uniformity of the transfer function of the steering transmission ratio in accordance with the present teachings is represented by graph 19. As can be seen in FIG. 5, the fast steering ratio of graph 19 can be achieved in a significantly wider angular range around the straightahead position of 0° as compared with graph 18. Moreover, the ratio fluctuation (and therefore, torque fluctuation) depicted in graph 19 is reduced over the entire angular range as compared with graph 18, and the configuration according to graph 19 is less sensitive to asymmetries (shifting of graph 19 parallel to the abscissa). On the other hand, a greater non-uniformity of the overall transfer function could also be allowed with a configuration of the steering column in accordance with graph 19 in order to achieve an even faster ratio in the straightahead position.

In accordance with the present teachings, it is possible with the universal joint to achieve the reverse case of a slow steering ratio in the straightahead position of the steering column, for example, with small trucks to improve steering behavior when towing trailers.

Overall, the design possibilities for a steering column can be significantly increased by the use of the universal joints according to the invention by virtue of the 360° non-uniformity introduced by said joints into the transfer function of the steering movement.

Figure 6:
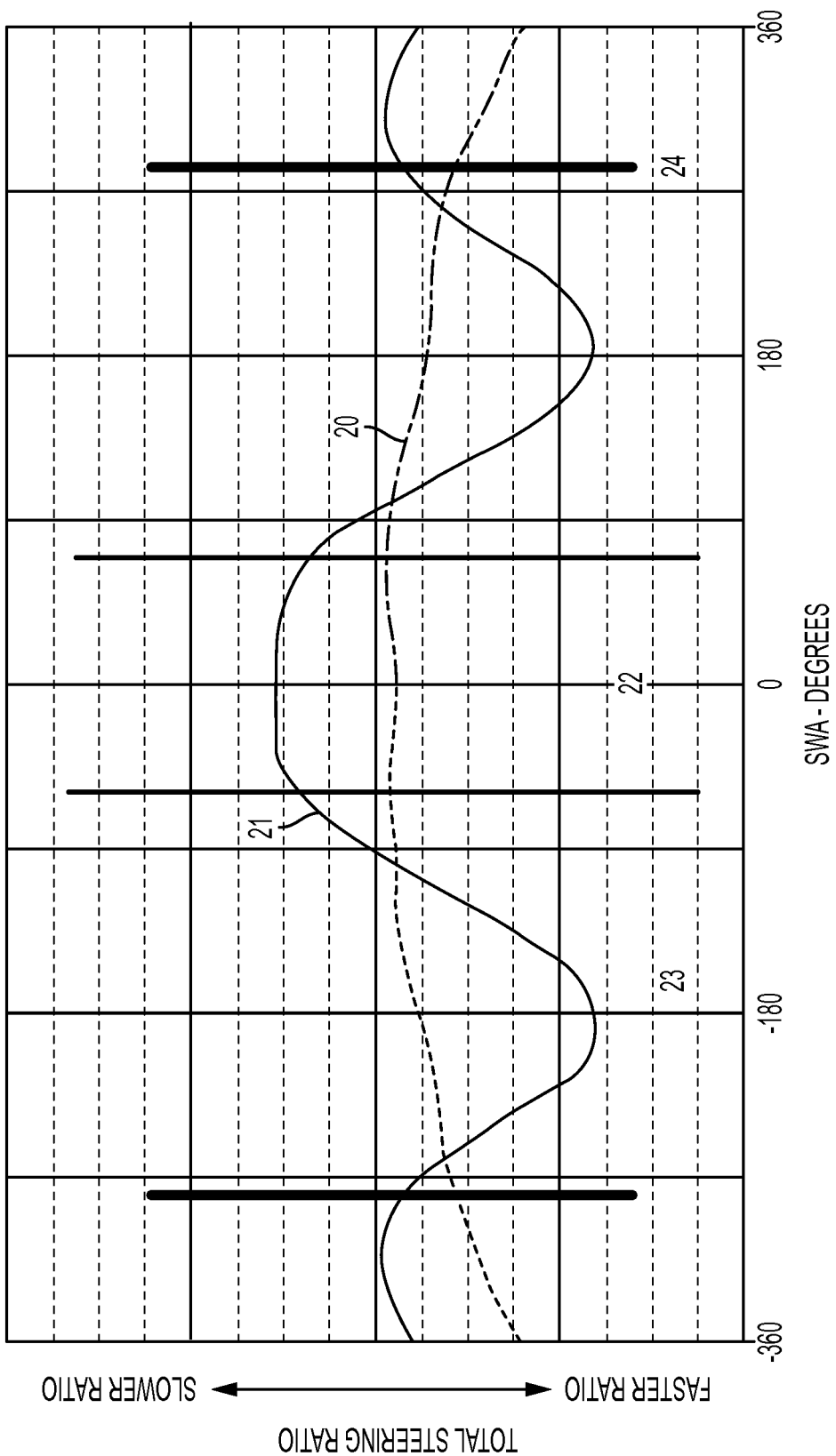
FIG. 6 shows a second diagram intended to illustrate the action of a steering column fitted with a universal joint in accordance with the present teachings.
Figure 7A:
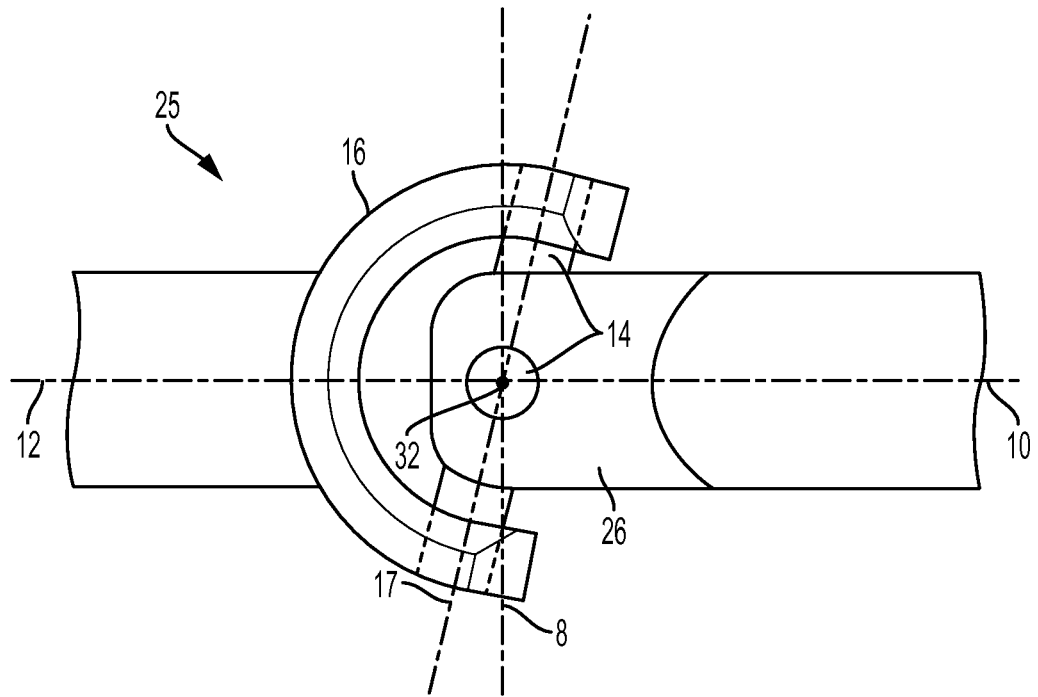
FIG. 7A shows a side view of a second embodiment of a universal joint including of joint axes that form acute or obtuse angles with respect to longitudinal axes of the shafts, in accordance with the present teachings.
Figure 7C:
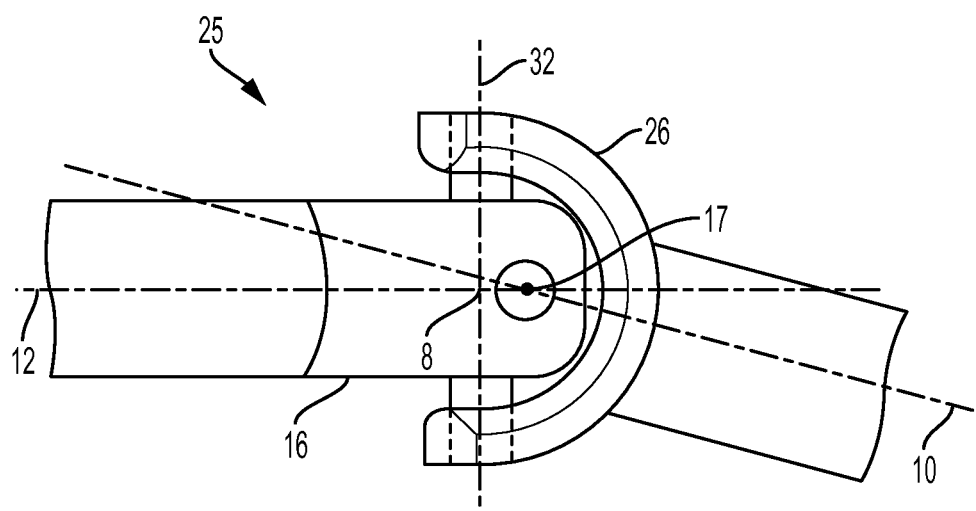
FIG. 7C shows a top view of the universal joint of FIG. 7A, including joint axes that form acute or obtuse angles with respect to longitudinal axes of the shafts, in accordance with the present teachings.
Figure 7B:
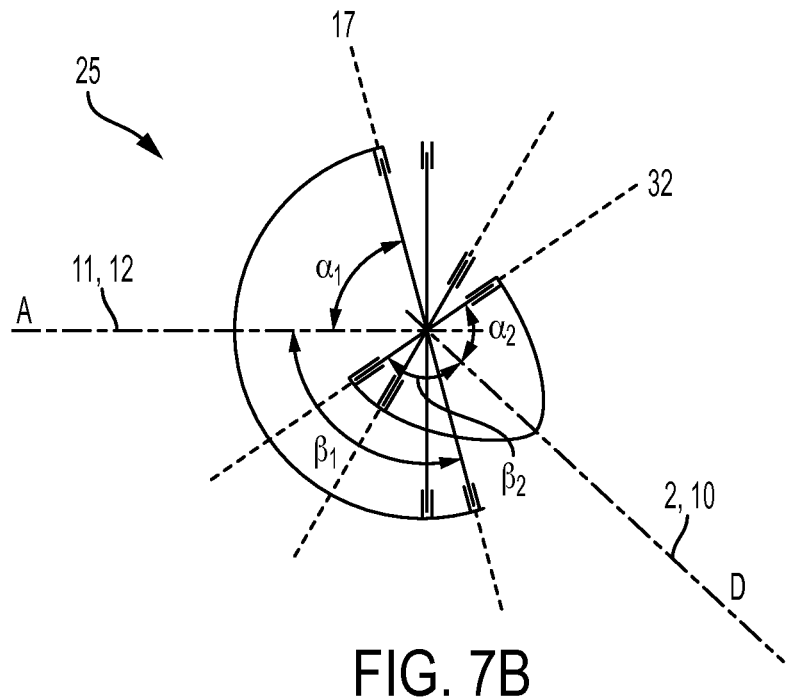
FIG. 7B shows a schematic geometric view of the universal joint of FIG. 7A, including joint axes that form acute or obtuse angles with respect to longitudinal axes of the shafts, in accordance with the present teachings.

In some applications, e.g., on sports cars, a fast steering ratio deviating from a straightahead position of a steering column is desired for better maneuverability, for example, the steering transmission ratio in the straightahead position should lie within a predetermined target range. FIG. 6 illustrates the action of a steering column fitted with at least one universal joint 15 according to the present teachings. Graph 20 illustrated in FIG. 6 represents the overall transmission ratio (ordinate) of a steering column against the angle of rotation plotted on the abscissa without using a universal joint in accordance with the present teachings (i.e., using a conventional universal joint), whereas graph 21 represents the overall transmission ratio of the steering column when using at least one universal joint in accordance with the present teachings in the steering column connection. Graph 21 represents a configuration of the steering column with a "non-twitchy" steering transmission ratio (slow steering ratio) in a straightahead position range 22, while rapid maneuverability (fast steering ratio) of the vehicle is available in a maneuvering range 23. In a steering lock range 24, the steering transmission ratio rises again, for which reason it is advantageously possible in this range to reduce the demand on a steering torque assistance system.

In accordance with the present teachings, in each of the exemplary embodiments of the universal joint described herein, the acute or obtuse angle α or β differs in magnitude by at most 10° from a right angle, wherein an illustrative steering column has at least one upper and one lower universal joint according to the invention (in a similar manner to that illustrated in FIG. 1). Thus, the angle formed between the joint axis 17 and the longitudinal axis 12 ranges between 80° and 100°. In an alternative embodiment, not illustrated, it is envisioned that a universal joint in accordance with the present teachings may form an angle in the range of 75° to 105° between a joint axis and a respective shaft longitudinal axis.

In other applications, in which the center of gravity of the steering column lies outside the axis of rotation of the steering column, an unwanted torque fluctuation with a period of 360° can be measured. By means of the universal joint in accordance with the present teachings, which has a period of 360°, it is even possible to compensate for an unwanted non-uniformity of this kind in a steering column.

In accordance with the present teachings, the universal joint described above is not restricted to the embodiment disclosed herein but also includes further embodiments with the same action. In particular, the joint axis inclination (angle φ), shown herein, of one (first) joint yoke is also possible on the other (second) joint yoke. An inclination of the bearing axes of the joint part in contrast to the right angled orientation, described herein, of the bearing axes of the joint part is also possible.

In a preferred embodiment, the universal joint according to the invention is used to connect torque transmitting shafts, in particular for steering columns of motor vehicles. Although described herein with respect to steering columns for motor vehicles, it should be understood that the inclined yoke universal joint of the present teachings may be used in many other situations in which a standard universal joint is employed. For example, as will be clear to those of skill in the art, an inclined yoke universal joint may be used for engine transmissions and in bicycles. These examples are for illustrative purposes only and are not intended to provide an exhaustive list of potential uses.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A universal joint for connecting torque transmitting shafts having two joint yokes, each of which can be connected to one of the shafts, each of the shafts having a longitudinal axis, each of the joint yokes having a pair of bearings, each of the bearings defining a joint axis, and having a joint part arranged between the joint yokes, the joint part having two pairs of complementary bearings;
   wherein the two joint yokes are coupled to one another by the joint part in a pairwise interaction between the bearings and the complementary bearings;
   wherein at least one joint axis forms an acute or an obtuse angle with the longitudinal axis of the corresponding shaft; and
   wherein each pair of the complementary bearings of the joint part defines a bearing axis, and wherein said bearing axes intersect at an acute angle or an obtuse angle.

2. The universal joint of claim 1, wherein each of the complementary bearings comprises a bearing journal and each of the bearings comprises a bearing opening which receives one of the bearing journals.

3. A steering column for a motor vehicle, comprising:
   at least two torque transmitting shafts,
   at least one universal joint in accordance with claim 1 for connecting the at least two torque transmitting shafts.

4. The universal joint of claim 1, wherein the universal joint is configured to transmit steering movements to a steering gear.

5. A universal joint, comprising:
   a first joint yoke having a first joint axis, the first joint axis formed at a first angle with respect to a longitudinal axis of a first shaft connected to the first joint yoke;
   a second joint yoke having a second joint axis, the second joint axis formed at a second angle with respect to a longitudinal axis of a second shaft connected to the second joint yoke; and
   a connection element configured to couple the first joint yoke to the second joint yoke via the first and second joint axes,
   wherein at least one of the first and second angles is an obtuse angle or an acute angle that deviates no more than about 15° from a right angle.

6. The universal joint of claim 5, wherein the first angle is an acute angle or an obtuse angle.

7. The universal joint of claim 6, wherein the second angle is approximately a right angle.

8. The universal joint of claim 6, wherein the second angle is an acute angle or an obtuse angle.

9. The universal joint of claim 5, wherein the connector element comprises first and second bearing journals.

10. The universal joint of claim 5, wherein the first joint axis is defined by first and second bearing openings in the first joint yoke.

11. The universal joint of claim 5, wherein the connection element has two pairs of complementary bearings and each pair of the complementary bearings of the connection element defines a bearing axis, and wherein said bearing axes intersect at an acute bearing axes angle or an obtuse bearing axes angle.

12. A steering column for a motor vehicle, comprising:
   a first torque transmitting shaft having a first longitudinal axis and a first joint yoke;
   a second torque transmitting shaft having a second longitudinal axis and a second joint yoke; and
   a first joint axis defined by the first joint yoke and a second joint axis defined by the second joint yoke, wherein at least one of the first and second joint axes is formed at one of an acute angle and an obtuse angle relative to a respective longitudinal axis, wherein the acute angle or the obtuse angle deviates no more than about 15° from a right angle; and
   wherein the first and second joint yokes are coupled to one another by a connection element.

13. The universal joint of claim 1, wherein the acute angle or the obtuse angle formed by the at least one joint axis with the corresponding shaft longitudinal axis deviates no more than about 15° from a right angle.

14. The universal joint of claim 13, wherein the acute angle or the obtuse angle formed by the at least one joint axis with the corresponding shaft longitudinal axis deviates no more than about 10° from a right angle.

15. The steering column of claim 12, wherein the connection element has two pairs of complementary bearings and each pair of the complementary bearings of the connection element defines a bearing axis, and wherein said bearing axes intersect at an acute bearing axes angle or an obtuse bearing axes angle.

16. The steering column of claim 12, wherein the first and second torque transmitting shafts form a transmission path between a steering input and a steering output.

17. The steering column of claim 16, wherein the transmission path extends between a steering wheel and a steering gear.

18. The steering column of claim 16, wherein the steering input is a rotational movement and the steering output is a translational output.

* * * * *